United States Patent [19]

Morioka et al.

[11] Patent Number: 4,742,446
[45] Date of Patent: May 3, 1988

[54] COMPUTER SYSTEM USING CACHE BUFFER STORAGE UNIT AND INDEPENDENT STORAGE BUFFER DEVICE FOR STORE THROUGH OPERATION

[75] Inventors: Tetsuya Morioka; Tsutomu Tanaka, both of Yokohama; Katsumi Onishi, Kawagoe; Yuji Oinaga, Tokyo, all of Japan

[73] Assignee: Fujitsu Limited, Kawasaki, Japan

[21] Appl. No.: 682,309

[22] Filed: Dec. 17, 1984

[30] Foreign Application Priority Data

Dec. 29, 1984 [JP] Japan ................................ 58-246104

[51] Int. Cl.⁴ ........................................... G06F 12/06
[52] U.S. Cl. ................................................. 364/200
[58] Field of Search ... 364/200 MS File, 900 MS File

[56] References Cited

U.S. PATENT DOCUMENTS

| 4,045,781 | 8/1977 | Levy | 364/200 |
|---|---|---|---|
| 4,047,243 | 9/1977 | Dijkstra | 364/200 |
| 4,315,312 | 2/1982 | Schmidt | 364/200 |
| 4,323,968 | 4/1982 | Capozzi | 364/200 |
| 4,344,130 | 8/1982 | Fung | 364/200 |
| 4,439,829 | 3/1984 | Tsiang | 364/200 |
| 4,467,414 | 8/1984 | Aragi et al. | 364/200 |

Primary Examiner—Raulfe B. Zache
Assistant Examiner—Emily Y. Chan
Attorney, Agent, or Firm—Staas & Halsey

[57] ABSTRACT

A computer system includes a processing unit; main storage; cache buffer storage provided between the processing unit and the main storage; and a store buffer device between the processing unit and main storage, receiving data identical to that stored in the cache buffer storage and control information in response to requests from the processing unit and transferring the data and control information to main storage. The transmission from the processing unit to the store buffer device and from the store buffer device to main storage are in a machine cycle. The store buffer device includes a controller, data register sets, each set including registers for receiving data to be stored in main storage, a byte mark register set of byte mark registers for information indicating storable data in the data registers, and an address register set of address registers for a starting store address in main storage for the data in the data registers. The number of data register sets is a plurality of times the bus width of the central processor. Each byte mark register has bits corresponding to the number of data register sets multiplied by the number of bytes in each data register.

17 Claims, 5 Drawing Sheets

COMPUTER SYSTEM USING CACHE BUFFER STORAGE UNIT AND INDEPENDENT STORAGE BUFFER DEVICE FOR STORE THROUGH OPERATION

BACKGROUND OF THE INVENTION

1. Field of the Invention

The present invention relates to a digital computer system more particularly to a store buffer device provided between a central processing unit (CPU) and a main storage unit (MSU) for updating memory contents in the MSU to be identical to that in a buffer storage also provided between the CPU and the MSU.

2. Description of the Related Art

In a digital computer system for high speed data processing, it is possible to improve the substantive access time from a CPU to an MSU having a large memory capacity by providing a buffer storage (cache memory) between the CPU and the MSU.

Data required for processing the in CPU is transferred in advance from a corresponding memory area in the MSU to a predetermined memory area in the buffer storage. Thus, the CPU can store data in or read data from the buffer storage, instead of the MSU, at a higher access speed.

The buffer storage, however, generally has a smaller memory capacity than the MSU. When the buffer storage is full and new data must be placed in the buffer storage, the memory contents in a certain region of the buffer storage, having a size greater than the memory capacity required for the new data, must be replaced with the new data. The memory content replaced is that for which access is requested least frequently or that whose access was requested the longest time ago. As a consequence, the data to be replaced must be restored to the corresponding area in the MSU before the new data is transferred to the buffer storage.

To update stored data in a buffer storage, two approaches are known: a swapping method and a store-through method. The present invention pertains to the store-through method.

To clarify the difference between the two approaches, however, the swapping method will be explained in brief. In the swapping method, the CPU performs both read and store operations with the buffer storage when the required data exists in the buffer storage. If the CPU requires new data to be placed in the buffer storage, the CPU first seeks a suitable vacant area in the buffer storage which can accommodate the new data and transfers the data in the MSU to the vacant area. When there is no suitable vacant area in the buffer storage, it performs a swapping operation. Specifically, the CPU seeks a suitable erasable area in the buffer storage, moves current data stored in the erasable area to the corresponding area in the MSU, and transfer the required data in the MSU to the erasable area in the buffer storage. In comparison with the store-through method, keeping data in the MSU identical to that in the buffer storage is somewhat more complex. On the other hand, it is not necessary to provide any additional store buffer devices.

In the store-through method, the CPU stores data in the MSU simultaneously with storing data in the buffer storage, the data stored in the MSU being identical to that stored in the buffer storage. As a result, the memory content in the MSU is kept identical to the current memory content in the buffer storage. When new data is to be placed in the buffer storage, the required new data can therefore be transferred from the MSU to a suitable area in the buffer storage without a swapping operation by just writing over the contents of the buffer area.

The primitive store-through method mentioned above, however, obviously reduces the CPU performance, cancelling out the merits of provision of a buffer storage, since a direct store operation from a CPU to an MSU requires a longer time than that of a buffer storage and the CPU must await completion of the store operation in the MSU. In order to overcome this problem, a store buffer device is normally provided between the CPU and the MSU, separate from the buffer storage and independently operable from the buffer storage.

The store buffer device mainly consists of a plurality of registers, each having a higher operation time than the buffer storage. With a store buffer device, the CPU can transmit data identical to that to be stored in the buffer storage and a control signal therefor to the store buffer device at the same time as storing data in the buffer storage. When an acknowledge signal is received from the store buffer device, which means the store buffer device has received the data and the control signals, the CPU proceeds with the next step after completion of the store operation in the buffer storage without waiting for completion of the store operation in the MSU. The store buffer device can transmit the data and the control signals temporarily held therein to the MSU at any time, independent of the operation of the CPU and the buffer storage. The received data is actually stored in the corresponding memory area in the MSU in accordance with the received control signals. As can be clearly understood, due to the provision of the store buffer device the CPU is free from the reduced performance incumbent with direct storage of data in the MSU.

Prior art computer systems based on the store-through method, however, still suffer from some disadvantages. The prior store buffer device consists of a plurality of buffer sets, for example, five sets, a control circuit cooperating therewith, and buffer registers provided between the CPU and the buffer sets and commonly used for receiving data and control signals thereof. Each buffer set includes a data register for temporarily storing data received from the CPU through the buffer register, a byte mark register for holding flags indicating storable data bytes in the data registers, and an address register for holding a starting storage address in the MSU for the data bytes in the data register. Each data register has a predetermined bit length, defined by, for example, a plurality of bytes to receive a plurality of data bytes to be stored in the MSU from the CPU upon a store request from the CPU.

Data of a plurality of bytes to be transmitted to the store buffer device at a single store request is defined by the transmission capacity between the CPU and the store buffer device during a machine cycle of the CPU. The plurality of data bytes to be transferred to the MSU from the store buffer device at a transfer command is defined by the transfer capacity between the store buffer device during a machine cycle of the CPU. This is because all devices in the computer system should be synchronized with the machine cycle.

The desired byte number of each data register is set, for example, to eight (8) bytes considering the above.

Obviously, requests are not always for all the data bytes in the data register, thus the data byte mark register must indicate those data bytes to be stored. The data byte mark register is composed of a plurality of bits corresponding to the plurality of bytes of the data register and indicated the data bytes to be stored.

A plurality of store buffer sets is provided to avoid a reduction in the performance of the CPU when many store requests consecutively arise during a short period or when a store request is made for a plurality of data bytes exceeding the capacity of one data register. If there were only one store buffer set, in the first case, the register in the store buffer set might not be empty when the next store request arose and, thus, the CPU would have to wait until the registers became free after reception of an acknowledge signal from the MSU. In the second case, the CPU would have to divide and transmit a plurality of store requests each with a plurality of data bytes equal to or less than the length of one data register with, accordingly, the same adverse situation as mentioned above.

Even when the prior art store buffer device includes a plurality of store buffer sets, the prior art digital computer system is adversely affected in its access of storage data by the inherent delay between the store buffer device and the MSU. Normally, a circuit for a store buffer device is installed on the same printed circuit (PC) board as the circuit of the CPU or on another PC board adjacent to the PC board for the circuit of the CPU, so that each store request to the store buffer device can be accepted during a single machine cycle. On the other hand, the store buffer device is located a relatively great distance from the MSU. The considerable distance between the store buffer device and the MSU requires a longer signal propagation time, for example, two machine cycles: one for data transmission to the MSU and one for reception of an acknowledge (ACK) signal from the MSU, as shown in FIG. 1.

Note that, even in the prior art system, upon receipt of store request(s) from the CPU, the store buffer device first transmits to the MSU data bytes kept in the data register and control signals thereof kept in the byte mark register and the address register at a machine cycle 1 in FIG. 1. After receipt of the acknowledge signal from the MSU at a machine cycle 2 in FIG. 1, the store buffer device can transmit to the MSU the next data bytes and control signals, if any exist, at a machine cycle 3 in FIG. 1 without waiting until completion of the storage of the first data bytes in the MSU. This helps eliminate the delay in the store buffer device, thus increasing the availability of the store buffer device for acceptance of new store requests from the CPU and, thus, reducing the probability of waiting for queuing to the store buffer device in the CPU.

On the other hand, it is clear that two machine cycles are required for transferring data bytes in one data register to the MSU. The number of machine cycles increases along with the distance between the store buffer device and the MSU.

With a store buffer device consisting of five store buffer sets and data byte registers of eight bytes each and, for example, a data series consisting of a first data set of six data bytes, a second data set of 16 data bytes, a third data set of 16 data bytes a fourth data set of eight data bytes, and a fifth data set of five data bytes, 14 machine cycles are required for storing the series, even in an ideal condition under which no waiting time occurs in the store buffer device. The 14 machine cycles consist of two machine cycles each for the first, fourth, and fifth data sets and four machine cycles each for the second and third data sets. In the case of a consecutive store request in a short period, the number of machine cycles would further increase due to the waiting time in the CPU and in the store buffer device.

The longer access tiime between the store buffer device and the MSU is a first disadvantage in the prior art.

Another disadvantage in the prior art computer system is a lack of flexibility of formation of data, due to the need to set data into the data register with reference to a starting store address in the address register. This will be described later with reference to embodiments of the present invention. This disadvantage may finally lead to a reduction in the performance of the CPU.

The above disadvantages may be particularly serious in an ultra-high speed digital computer system, for example, a computer system having a plurality of arithmetic units for forming a pipeline processing machine. This disadvantages may also be increased when a great deal of data is to be stored at one store request or in a short period.

SUMMARY OF THE INVENTION

It is an object of the present invention to provide a digital computer system with a faster store-through operation, particularly for many consecutive data store requests.

It is another object of the present invention to provide a digital computer system with the flexibility of loading data into a store buffer device.

According to the present invention, there is provided a digital computer system including: a CPU; an MSU having a large memory capacity; a buffer storage unit provided between the CPU and the MSU and functioning as an effective memory device for the CPU with a high speed access time; and a store buffer device provided between the CPU and the MSU, receiving data identical to that to be stored in the buffer storage unit and control information for the received data in response to requests from the CPU and transferring the received data and control information to the main storage unit. The transmission operation from the CPU to the store buffer device and transfer operation from the store buffer device to the MSU are respectively effected on the basis of a machine cycle timing. The store buffer device includes a controller, a plurality of data register sets, each set including a plurality of data registers for receiving data to be stored into the MSU, a byte mark register set including a plurality of byte mark registers for receiving information indicating storable data in the data registers, and an address register set forming a plurality of address registers for receiving a starting store address in the MSU for the data to be stored in the data registers.

It is preferable that the byte mark register have a plurality of bits corresponding to the number of data register sets multiplied by the number of bytes in each data register.

BRIEF DESCRIPTION OF THE DRAWINGS

Other objectives and features of the present invention will be described below with reference to the accompanying drawings, in which.

DESCRIPTION OF THE PREFERRED EMBODIMENTS

Figure 1:
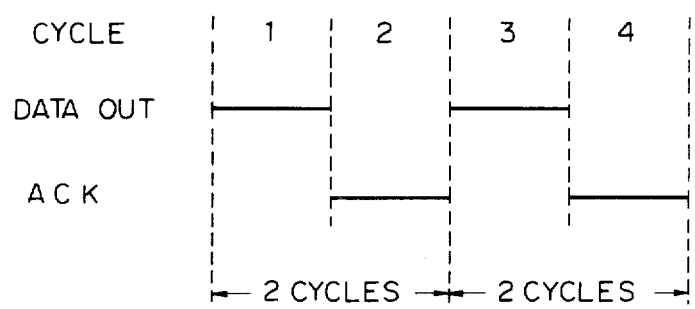
FIG. 1 is a timing chart of data storage from the store buffer device to the MSU in a prior art digital conputer system.
Figure 2:
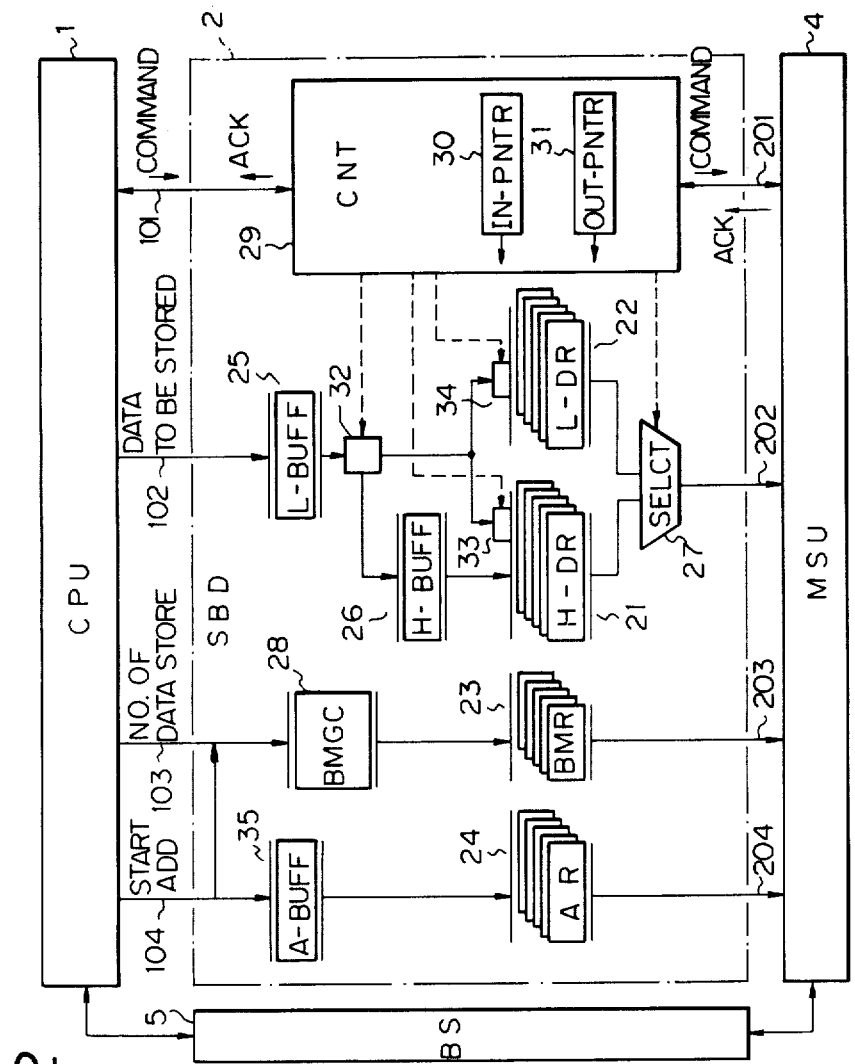
FIG. 2 is a block diagram of a digital computer system including a buffer storage and a store buffer device in accordance with the present invention.

FIG. 2 is a block diagram of an embodiment of a digital computer system in accordance with the present invention. In FIG. 2, the computer system includes a CPU 1, an MSU 4 having a plurality of semiconductor memory cells, a buffer storage (BS) 5 provided between the CPU 1 and the MSU 4, and a store buffer device 2, also provided between the CPU 1 and the MSU 4. The CPU 1, the MSU 4, and the BS 5 are basically similar to those of the prior art. Accordingly, a description of the construction and operation of the same is omitted except as required for the store-through operation.

The store buffer device 2 inlcudes a controller 29 having an input pointer register 30 and an output pointer register 31, a set of address registers (AR) 24, a set of byte mark registers (BMR) 23, a set of high order data registers (H-DR) 21, a set of low order data registers (L-DR) 22, and an output selection circuit (SELECT) 27. The store buffer device 2 also includes a byte mark generation circuit (BMGC) 28 between the CPU 1 and the set of byte mark registers 23, and an address buffer 32 between the CPU 1 and the address registers 24. The store buffer device 2 further includes a high order data buffer register (H-BUFF) 26, a low order data buffer register (L-BUFF) 25, and gate circuits 32 to 34 cooperating therewith in accordance with control signals, shown by a dotted line, from the controller 29.

In the embodiment, the set of address registers 24 consists of five address registers, the set of byte mark registers 23 of five byte registers, the set of high order data registers 21 of five data registers, and the set of low order data registers 22 of five data registers, respectively.

Each high order data register has a capacity to store eight data bytes, i.e., each high order data register includes 64 bits. The bit length of each low order data register is identical to that of the high order data register. The bit lengths of high and low order buffer registers 26 and 25 are also identical to that of the high order data register.

In the embodiment, each byte mark register has an eight-bit length corresponding to the data register's byte length.

Between the CPU 1 and the store buffer device 2, there is provided a plurality of connection wires 101 to 104. The wires 101 are used for transmission of a store command to the controller 29 and for reception of an acknolwedge signal from the controller 29. The wires 102 are used for transmission of a plurality of data bytes to be stored in the low order buffer register 25. The wires 103 are used for transmission of a number of data bytes to be stored in the byte mark generation circuit 28. The wires 104 are used for transmission of a starting storage address in the MSU 4 to the address register set 24 through an address buffer 35 and to the byte mark generation circuit 28.

Between the store buffer device 2 and the MSU 4, there is also provided a plurality of connection wires 201 to 204. The wires 201 are used for transmission of a store command from the controller 29 to a control circuit in the MSU 4 and for reception of an acknowledge signal from the MSU 4. The wires 202 are used for transmission of data to be stored in the MSU 4 stored at any one of the high or low order data registers through the data selection circuit 27. The wires 203 are used for transmission of byte mark indication signals from the byte mark register set 23. The wires 204 are used for transmission of a starting store address from the address register set 24.

The store buffer device 2, on one hand, is arranged adjacent to the CPU 1 for quick response between the CPU 1 and the store buffer device 2 within a single machine cycle under normal operating conditions. On the other hand, the store buffer device 2 is far from the MSU 4, requiring two machine cycles between the transmission of the store command and the receipt of the acknowledge signal on one store request, as mentioned in the prior art description.

The basic operation of the digital computer system, more particularly of the store buffer device, will be explained below.

When a data storage request of eight or less data bytes is made in the CPU 1, the CPU 1 outputs to the BS 5 a store command with data to be stored and transmits to the store buffer device 2, a store command, a starting storage address, a number of storage bytes, and data bytes to be stored identical to those to be stored in the BS 5. This transmission operation is activated on the basis of the machine cycle of the CPU 1. The store buffer device 2 receives the above information in the corresponding circuit elements: the store command in the controller 29, the data bytes in the low order buffer register 25, the number of storage bytes in the byte mark generation circuit 28, and the starting storage address in an address buffer register 35. After reception of the above information, the store buffer device 2 sends an acknowledge signal to the CPU 1. The CPU 1 can therefore proceed with the operation after completion of the storage operation in the BS 5 without awaiting for the completion of the storage operation in the MSU 4. The above operations can be performed in a single machine cycle. In this regard, the computer system is similar to the prior art computer system.

After that, the store buffer device 2, can perform the following operations independent of the CPU 1: transferring the stored data in the low order buffer register 25 to one of the high order data registers 21 through the gate circuits 32 and the high order buffer register 26; transferring the stored starting storage addreaa in the address buffer register 32 to one of the address registers 24; and generating byte mark signals indicating storable data bytes at the byte mark generation circuit 28 in response to the number of storage bytes and transferring the generated byte mark signals to one of the byte mark registers 23. The selection of one of the registers in the registers sets 21, 24, and 23 mentioned above is effected under control of the input pointer register 30 in the controller 29. In addition, the transfer operations to the MSU 4 of data and control signals stored in the above registers and the controller 29 can be effected in parallel. The selection of one of the registers in the register sets 21, 24, and 23 is effected under control of the output pointer register 31 in the controller 29. The data stored in the high order data register is output through the data selection circuit 27 selected in accordance with a control signal from the controller 29, shown by a dotted line. The above operation can be normally accomplished during a first machine cycle, after receiving the storage request.

Upon receipt of the above storage request, the MSU 4 may send the acknowledge signal during the next machine cycle. When the controller 29 receives the acknowledge signal from the MSU 4, the storage request from the CPU 1 to the MSU 4 can be deemed completed unless the storage operation in the MSU 4 is indicated not completed. Consequently, the above used registers are rendered empty and ready for a new request.

As is clear from the above, even in the embodiment shown in FIG. 2, two machine cycles are required due to the longer distance between the store buffer device 2 and the MSU 4 and to the low operation speed of the MSU 4. In this regard, the machine cycles required between the store buffer device 2 and the MSU 4 are the same as in the prior art.

However, note that the above storage request was only for eight or less data bytes and was a single request to easily explain the basic operation of the store buffer device 2 shown in FIG. 2, and that the low order data register set 22 was not used. The merits of the present invention will be explained with reference to the specific storage data mode.

Figures 3, 4:
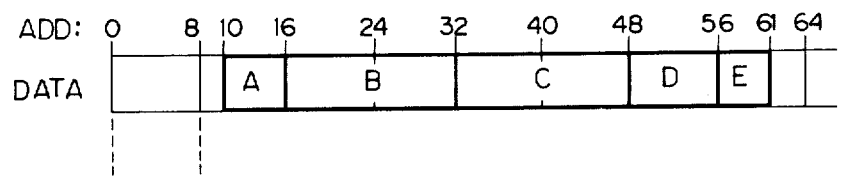
FIG. 3 is a format diagram of a plurality of data bytes to be stored in the MSU through the store buffer device shown in FIG. 2.
FIG. 4 is a diagram of an arrangement of information stored in registers in the store buffer device shown in FIG. 2 in response to the data shown in FIG. 4.

FIG. 3 is a view of the format of a plurality of data bytes to be continuously stored in the MSU 4. The data series in FIG. 3 is formed of data A consisting of six data bytes with the 10th start address in the MSU 4, data B of 16 data bytes with the 16th start address, data C of 16 data bytes with the 32nd start address, data D of eight data bytes with the 48th start address, and data E of five data bytes with the 56th start address. Actually, it is desirable that the CPU store the data series of data A to E in only one store request, however, the limitation on the number transmittable data bytes in a single machine cycle produced by the bus-width of the CPU 1 means the data series must be divided into five data sets as shown in FIG. 3. On the other hand, this data configuration corresponds to that mentioned with reference to the prior art store buffer device operation. The data sets A to E in FIG. 3 are used, incidentally, as an example, for easy comparison of the performance of the present invention with the performance of the prior art computer system and respectively correspond to the first to fifth data sets mentioned before.

The operation for storing the data series shown in FIG. 3 will be explained below with reference to FIG. 4.

FIG. 4 is a view of an arrangement of information stored in the registers in the store buffer device 2. FIG. 4 is a view of contents held in the first to fifth address register AR, the high order data register H-DR, the low order data register L-DR, and the byte mark register BMR, from the left to the right in the drawing.

When storage of the data series shown in FIG. 3 is requested by the CPU 1, the CPU 1 first transmits a store command, the eighth starting store address, to the store buffer device 2, the number (six) of storage bytes, and the six bytes of data, for storing the data set A. The store buffer device 2 receives the above information and stores the starting store address in the first address register, the data bytes in the first high order data register through the low order and high order buffer registers 25 and 26, and the byte mark signal generated by the byte mark generating circuit 28 in the first byte mark register, as shown in FIG. 4(a), under control of the input pointer register 30. In this example, the actual start address at the MSU 4 is the 10th address, however the number eight is transmitted and stored in the first address register, because the start address to be transmitted to the MSU 4 indicates a starting address at a left end of the data in the high order data register and is defined on the basis of a modulus of eight corresponding to the number of bytes in each data register. Accordingly, the data set consisting of six bytes is shifted by two bytes to the right end of the first high order data register and stored therein. Corresponding to the data format in the high order data register, the byte mark signal is generated as "00 11 11 11", "0" bit indicating inhibition of data storage in the corresponding portion of the high order data register and "1" bit indicating permission of data storage (or storable data). In the storage request, the first lower data register is not used, as is shown by a blank box in FIG. 4.

Upon receipt of the acknowledge signal from the store buffer device 2, the CPU 1 transmits to the store buffer device 2 a second group of information for the data set B accompanied with a store command. In the store buffer device 2, the above second group of information is stored in the corresponding second address register, a second high order data register, and a second low order data register, as shown in FIG. 4(b). In this case, two high and low order data registers are filled by the 16 data bytes. Note that the second high order data register and the second low order data registers are functionally connected in series to store 16 data bytes. The storage operation of the high and low order data, each of eight bytes, to the second high and the low order data registers is performed in a first-in manner, in other words, the high order data is stored in the high order data register, after that the low order data is stored in the low order data register. In addition, the data stored in the high and low order data registers are output in a first-out manner, which will be described later.

For storing the data set B, the signal of the number of the storage bytes does not have to define the inhibition of data storage or to shift data in the higher data register, thus, is not transmitted to the store buffer device 2. As a result, the byte mark signal is not generated by the byte mark generating circuit 28 and no second byte mark is set. The data set B consists of 16 bytes, thus two machine cycles are required to transmit it.

Similarly, the subsequent information for the data sets C to E is consecutively transmitted to the store buffer device 2 and saved in the corresponding registers, as shown in FIGS. 4(c) to 4(e).

Figure 5:
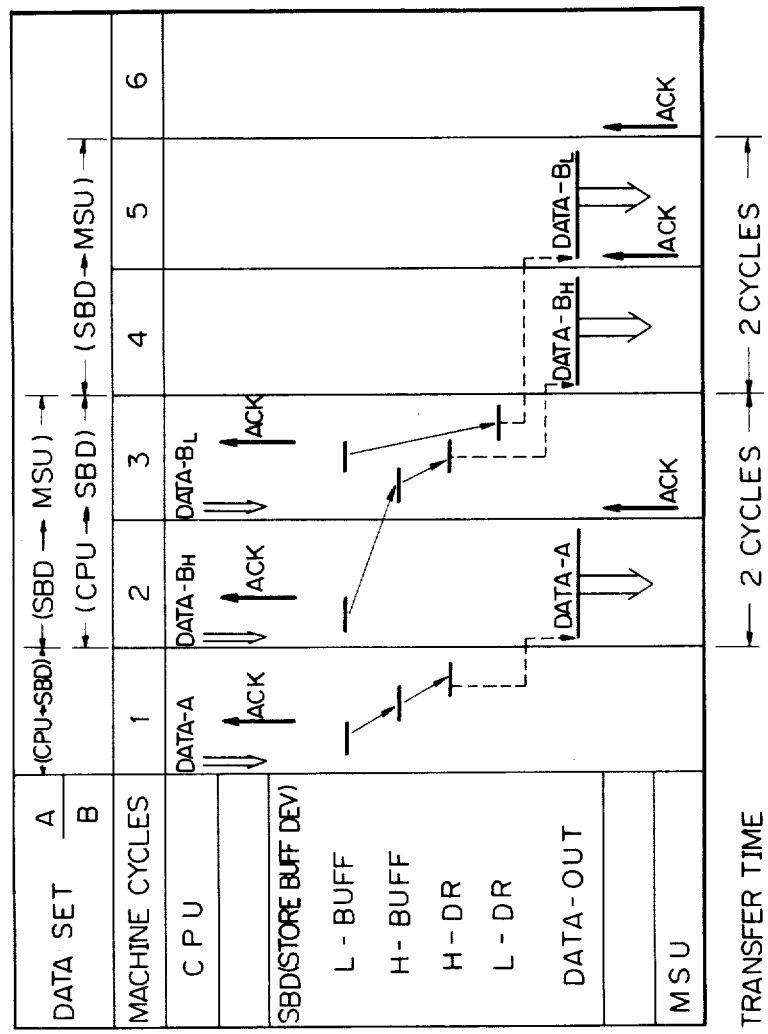
FIG. 5 is a timing chart of a data storage operation between the store buffer device and the MSU of FIG. 2.

The operation for transfer of the received information with the MSU 4 can be performed in parallel to the above receiving operation, as shown in FIG. 5.

FIG. 5 is a timing chart of the above operation for the data sets A and B.

As clearly understood from the above explanation and the timing chart of FIG. 5, two machine cycles, represented by machine cycles 2 and 3 in FIG. 5, are required for transfer of the data set A consisting of six data bytes.

During the transfer operation of the data set A to the MSU 4, the information for the data set B, consisting of 16 data bytes is saved in the second registers in the register sets 21 to 24. The high and low order data saved in the second high and low order data registers (H-DR and L-DR) are consecutively output to the MSU 4 during the machine cycles 4 and 5. In response to the reception of the high order data at a machine cycle 4, the MSU 4 issues an acknowledge signal similar to the above. The issuance of the acknowledge signal means the MSU 4 is ready for reception of a new transfer demand. Therefore, the low order data transferred at a machine cycle 5 can be received at the MSU 4. The acknowledge signal of the reception of the lower data is generated at a machine cycle 6.

Note that only two machine cycles, represented by machine cycles 4 and 5 in FIG. 5, are required for transfer of the data set B, even if the data set B consists of a greater number of bytes of data than the data set A. In other words, a 50% reduction of the transfer time over the prior art is achieved for transfer of 16 bytes of data from the store buffer device 2 to the MSU 4.

Accordingly, the total transfer time of the data sets A to E is 10 machine cycles in the embodiment shown in FIG. 2. On the other hand, the total transfer time in the prior art system was 14 machine cycles. It is clear that the effect of the reduction of the total transfer time becomes greater with the amount of data stored continuously or in a short period.

It is clear that any corresponding data registers in the data register sets 21 and 22, for example the second high and low order data registers mentioned above, are functionally connectable in series to perform the first-in queuing for receiving data from the CPU 1 and the first-out queuing for outputting data to the MSU 4.

It is also clear that a series of corresponding registers arranged at one sequence in the register sets 21 to 24, for example, the first high and low order data registers, byte mark register and address register, is independently operable in parallel timing with other series of corresponding register at other sequences in the register sets 21 to 24, for example the second high and low order data registers, byte mark register and address register, to perform input and output operations simultaneously.

In the above embodiment, each byte mark register in the byte mark register set 23 consists of eight bits for indicating the storable data in the high order data register and defining a starting store address accompanying the address register. This limits the flexibility of arrangement of data in the data registers in the store buffer device 2. Specifically, in the case of the data series shown in FIG. 3, even in a data series of 51 bytes, five transmission operations were required, as shown in FIG. 4 and the first, fourth, and fifth lower data registers were not used.

In order to eliminate the above disadvantage of the first embodiment, in a second embodiment, each byte mark register consists of 16 bits so as to indicate inhibition of data storage for both the high and low order data registers.

Figure 6:
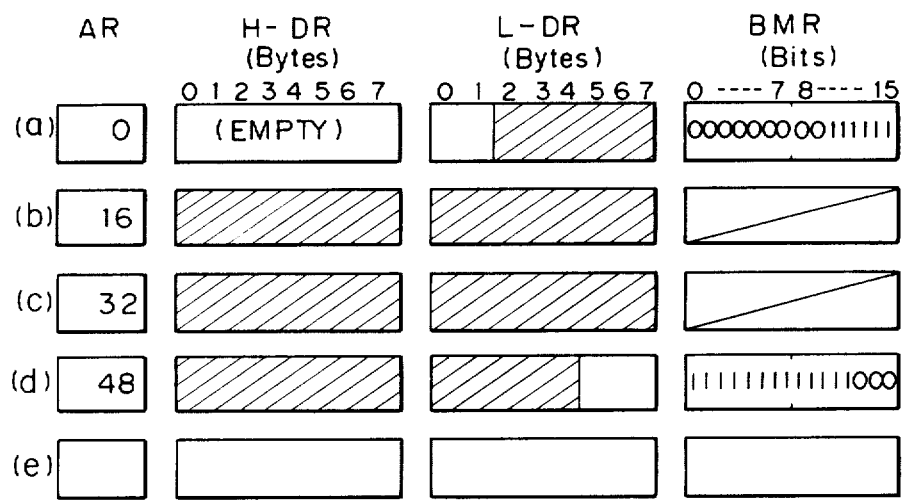
FIG. 6 is a view of another information arrangement in the registers in accordance with another embodiment of the store buffer device in accordance with the present invention.

According to the second embodiment, the number of transmission operations is reduced from five to four, as shown in FIG. 6, under the same transmission conditions as the first embodiment. FIG. 6 is a view of arrangements in the register and contents therein similar to FIG. 4. In the second embodiment, the total transfer time is further reduced to eight machine cycles.

Figure 7:
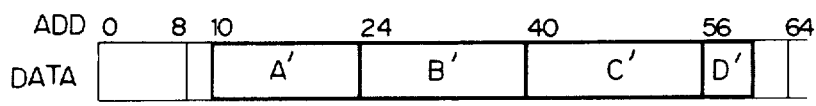
FIG. 7 is another format diagram of a plurality of data bytes similar to FIG. 3.

According to the second embodiment, the division of the data set is not limited to that as shown in FIG. 3. The data series can be divided as shown in FIG. 7. According to the data division format, data set A' may be saved in the first high and low order data registers, and the following data sets B' and C' may be saved in the second and third high and low order data registers. Data set E' may be saved in only the fourth high order data register. Control signals are saved in the corresponding address registers and the byte mark register. The transfer time is equal to that mentioned immediately above. This facilitates data division in the CPU 1 and simplification of the controller 29 and the byte mark generating circuit 28.

According to the second embodiment, a further reduction of the transfer time can be obtained.

Figure 8:
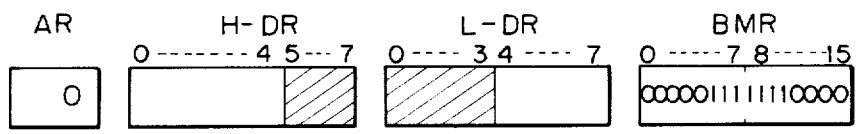
FIG. 8 is a view of still another information arrangement in the registers in accordance with another embodiment.

In storing seven bytes of data with a fifth starting address, in the prior art system, two transfer operations to the MSU were required; one for the three bytes of data with the fifth starting store address and other for the four bytes of data with the eighth starting store address. On the other hand, in the second embodiment, only one transfer operation is required, because the data can be saved in the high and low order data registers, as shown in FIG. 8.

The number of sets of data registers 21 and 22 can be expanded to three or more, for example, in accordance with the transmission time between the store buffer device 2 and the MSU 4. In addition, the byte length of the higher and lower data registers can be any power of two, for example, four, 16, or 32. However, it is preferable that the byte lengths of the high and low order data registers be identical, to facilitate the control of the data buffer registers 25, 26, the data register sets 21 and 22, and the data selection circuit 27.

We claim:
1. A digital computer system, comprising:
  a central processing unit having a machine cycle;
  a main storage unit;
  a buffer storage unit connected between said central processing unit and said main storage unit, receiving data from said central processing unit and storing the data in said main storage unit, reading data from said main storage unit and transmitting the data to said central processing unit, and functioning as an internal memory device for said central processing unit and operating at a high speed access time; and
  a store buffer device connected between said central processing unit and said main storage unit, having a higher operating speed than and operating independently of said buffer storage unit, receiving data identical to that stored in said buffer storage unit and control information, from said central processing unit, for the received data from said central processing unit in response to requests from said central processing unit and transferring the received data and control information to said main storage unit, the transfer operation from said central processing unit to said store buffer device and the transfer operation from said store buffer device to said main storage unit being effected during the machine cycle of said central processing unit, and said store buffer device including:
- a controller connected between said central processing unit and said main storage unit, and controlling the transfer operations;
- data register sets connected to said central processing unit, said controller and said main storage unit, each set including data registers for receiving data to be stored in said main storage unit from said central processing unit;
- a byte mark register set connected between said central processing unit and said main storage unit, and including byte mark registers for receiving, from said central processing unit, information designating data to be stored in said data registers; and
- an address register set connected between said central processing unit and said main storage unit, and including address registers for receiving a starting storage address in said main storage unit for the data to be stored in said main storage unit from the data registers from said central processing unit.

2. A digital computer system according to claim 1, wherein the data to be stored has a length and a number of data registers in each data register set is identical, and the corresponding data registers in said data register sets being functionally connectable in series to perform first-in and first-out queuing in response to the length of data to be stored.

3. A digital computer system according to claim 2, wherein each data register in the data register sets has the same number of bits.

4. A digital computer system according to claim 3, wherein said store buffer device further inlcudes data buffer registers connected between said central processing unit and the corresponding data register sets, the data buffer registers being connected in series, in response to the length of data to be stored in the register sets, to receive the data to be stored from said central processing unit and to output the received data to the corresponding data register sets.

5. A digital computer system according to claim 4, wherein the series connecting operation for said data buffer registers is performed in response to the machine cycle of said central processing unit.

6. A digital computer system according to claim 5, wherein series data stored in the data registers is continuously output to said main storage unit in predetermined sets in response to the machine cycle of said central processing unit.

7. A digital computer system according to claim 6, wherein said store buffer device further includes a data selection circuit operatively connected to said controller, to outputs of the respective data register sets and to said main storage unit, the data selection circuit forming a data transfer path between a selected data register in one of the data register sets and a data output terminal connected to said main storage unit under control of said controller.

8. A digital computer system according to claim 2, wherein the bit length of each data register is defined in byte units, the processing for input and output of the data registers being performed using a plurality of data bytes.

9. A digital computer system according to claim 2, wherein two data register sets are included in the store buffer device.

10. A digital computer system according to claim 1, wherein each byte mark register includes a predetermined number of bits defined by the data length of one data register.

11. A digital computer system according to claim 2, wherein each byte mark register includes a predetermined number of bits corresponding to a sum of the data lengths of the functionally series connectable data registers.

12. A digital computer system according to claim 1, wherein said store buffer device further includes a byte mark generating circuit connected between the byte mark register and said central processing unit, the byte mark generating circuit receiving signals from said central processing unit indicating a length of data to be stored and a start address for data storage, and generating a byte mark signal indicating storable data in the main storage unit for the data stored in the data registers in said main storage unit for the data stored in the data registers and the byte starting storage address in said main storage unit in dependence upon the start address.

13. A digital computer system according to claim 1, wherein the starting storage address stored in the address register and the information stored in the byte mark register define a byte starting storage address in the main storage unit for the data to be stored therein, from the data registers.

14. A digital computer system according to claim 1, wherein the number of byte mark registers is identical to the number of the data registers in each data register set, each byte mark register in the byte mark register set corresponding to a data register in each data register set and operating simultaneously with the corresponding data register in the respective data register sets.

15. A digital computer system according to claim 1, wherein the number of address registers is identical to the number of the data registers in each data register set, each address register in the address register set corresponding to a data register in each data register set and operating simultaneously with the corresponding data register in the respective data register sets.

16. A digital computer system according to claim 14, wherein corresponding registers including the data register sets, byte mark register set, and the address register set form groups and one group is independently operable in parallel with another group of corresponding registers to allow input and output operations simultaneously.

17. A digital computer system according to claim 15, wherein corresponding registers including the data register sets, byte mark register set, and the address register set form groups and one group is independently operable in parallel with another group of corresponding registers to allow input and output operations simultaneously.

* * * * *

UNITED STATES PATENT AND TRADEMARK OFFICE
CERTIFICATE OF CORRECTION

PATENT NO. : 4,742,446
DATED : May 3, 1988
INVENTOR(S) : Morioka et al.

It is certified that error appears in the above-identified patent and that said Letters Patent is hereby corrected as shown below:

Front Page [30] line 2, "1984" should be --1983--.

Column 1, line 10, "system" should be --system,--;

line 56, "transfer" should be --transfers--.

Column 3, line 4, "indicated" should be --indicates--;

line 62, "bytes a" should be --bytes, a--.

Column 4, line 19, "This" should be --The--.

Column 8, line 67, "with" should be --to--;

line 67, "to" should be --with--.

Signed and Sealed this

Twentieth Day of September, 1988

Attest:

DONALD J. QUIGG

*Attesting Officer*       *Commissioner of Patents and Trademarks*